United States Patent [19]

Priem et al.

[11] Patent Number: 4,908,780

[45] Date of Patent: Mar. 13, 1990

[54] ANTI-ALIASING RASTER OPERATIONS UTILIZING SUB-PIXEL CROSSING INFORMATION TO CONTROL PIXEL SHADING

[75] Inventors: Curtis Priem, Freemont, Calif.; Thomas Webber, Lynn, Mass.; Chris Malachowsky, Santa Clara, Calif.

[73] Assignee: Sun Microsystems, Inc., Mountain View, Calif.

[21] Appl. No.: 258,133

[22] Filed: Oct. 14, 1988

[51] Int. Cl.[4] .......................... G06F 15/62; G09G 1/16

[52] U.S. Cl. .......................... 364/521; 340/728; 340/723; 340/744; 364/518

[58] Field of Search .......................... 364/723, 518, 521; 340/747, 744, 723, 724, 728

[56] References Cited

U.S. PATENT DOCUMENTS

| | | | |
|---|---|---|---|
| 4,402,012 | 8/1983 | Knight | 358/160 |
| 4,586,037 | 4/1986 | Rosener et al. | 340/728 |
| 4,704,605 | 11/1987 | Edelson | 340/728 |
| 4,720,705 | 1/1988 | Gupta et al. | 340/724 |
| 4,780,711 | 10/1988 | Doumas | 340/728 |
| 4,808,984 | 2/1989 | Trueblood et al. | 340/723 |

*Primary Examiner*—Gary V. Harkcom
*Assistant Examiner*—Raymond J. Bayerl
*Attorney, Agent, or Firm*—Blakely, Sokoloff, Taylor & Zafman

[57] ABSTRACT

A method and apparatus for performing anti-aliasing of rendered lines, text and images displayed by a workstation on a video display. The anti-aliasing is performed by logically dividing each addressable frame buffer pixel into sixteen sub-pixels and generating a gray scale value for the displayed pixel that is a function of the number of sub-pixels crossed by a portion of a rendered image. The invented circuitry is part of the circuitry used for combining source and destination data which forms the displayed image namely, an anti-aliasing mask and filter, adder/subtractor logic, saturation logic and anti-aliasing logic.

15 Claims, 8 Drawing Sheets

| SSEL0 | SSEL1 | Sn-Sn+3 | OUT | |
|---|---|---|---|---|
| 0 | 0 | 0 | 0 | ZERO |
| 0 | 0 | 1 | 0 | |
| 0 | 1 | 0 | 1 | COMPLEMENT SOURCE |
| 0 | 1 | 1 | 0 | |
| 1 | 0 | 0 | 0 | SOURCE |
| 1 | 0 | 1 | 1 | |
| 1 | 1 | 0 | 1 | ONE |
| 1 | 1 | 1 | 1 | |

ANTI-ALIASING RASTER OPERATIONS UTILIZING SUB-PIXEL CROSSING INFORMATION TO CONTROL PIXEL SHADING

SUMMARY OF THE INVENTION

The present invention is a method and apparatus for performing anti-aliasing of rendered lines, text and images displayed by a workstation on a video display. The anti-aliasing is performed by logically dividing each addressable frame buffer pixel into sixteen sub-pixels and generating a gray scale value for the displayed pixel that is a function of the number of sub-pixels crossed by a portion of a rendered image. The invented circuitry is part of the circuitry used for combining source and destination data which forms the displayed image namely, an anti-aliasing mask and filter, adder/subtractor logic, saturation logic and anti-aliasing logic.

DETAILED DESCRIPTION OF THE INVENTION

The present invention is directed to an apparatus and method for use in a computer system used for the graphic display of images. Although th present invention is described with reference to specific circuits, block diagrams, signals, truth tables, bit lengths, pixel lengths, etc., it will be appreciated by one of ordinary skill in the art that such details are disclosed simply to provide a more thorough understanding of the present invention and the present invention may be practiced without these specific details. In other instances, well known circuits are shown in block diagram form in order not to obscure the present invention unnecessarily.

Figure 1:
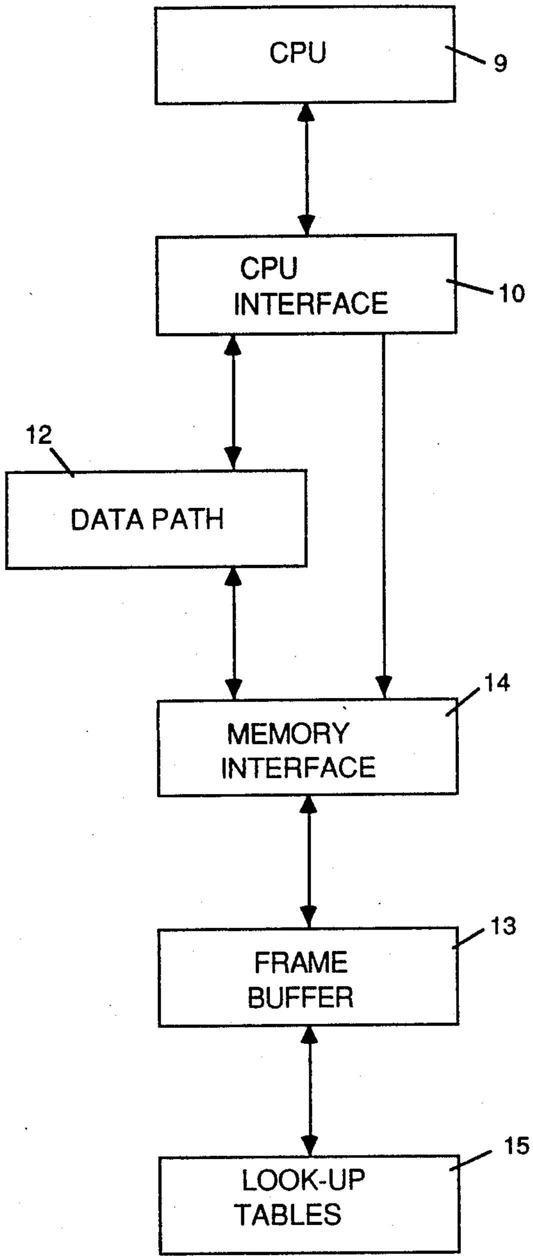
FIG. 1 is a block diagram showing the environment of the present invention.

In FIG. 1 there is shown a general block diagram of the environment of the present invention. CPU 9 is defined herein as embracing circuitry external to the other components shown in FIG. 1, and provides data, control signals and addresses through CPU interface 10 necessary for the operation of the invention herein described.

CPU 9 through CPU interface 10 also provides addresses to a memory interface 14 and data to data path circuitry 12. The data path circuitry 12 is also provided with data which is read from a display frame buffer 13 by memory interface 14. Data is outputted by data path circuitry 12 to memory interface 14 for writing therefrom to the frame buffer at an address provided by CPU 9. The present invention is directed to specific circuitry and techniques in data path 12. Details concerning CPU 9, CPU interface 10, frame buffer 13 and memory interface 14 will be apparent to those skilled in the art of computer created graphics displays and are therefore not set forth herein except as needed for a proper understanding of the invention.

Figure 2:
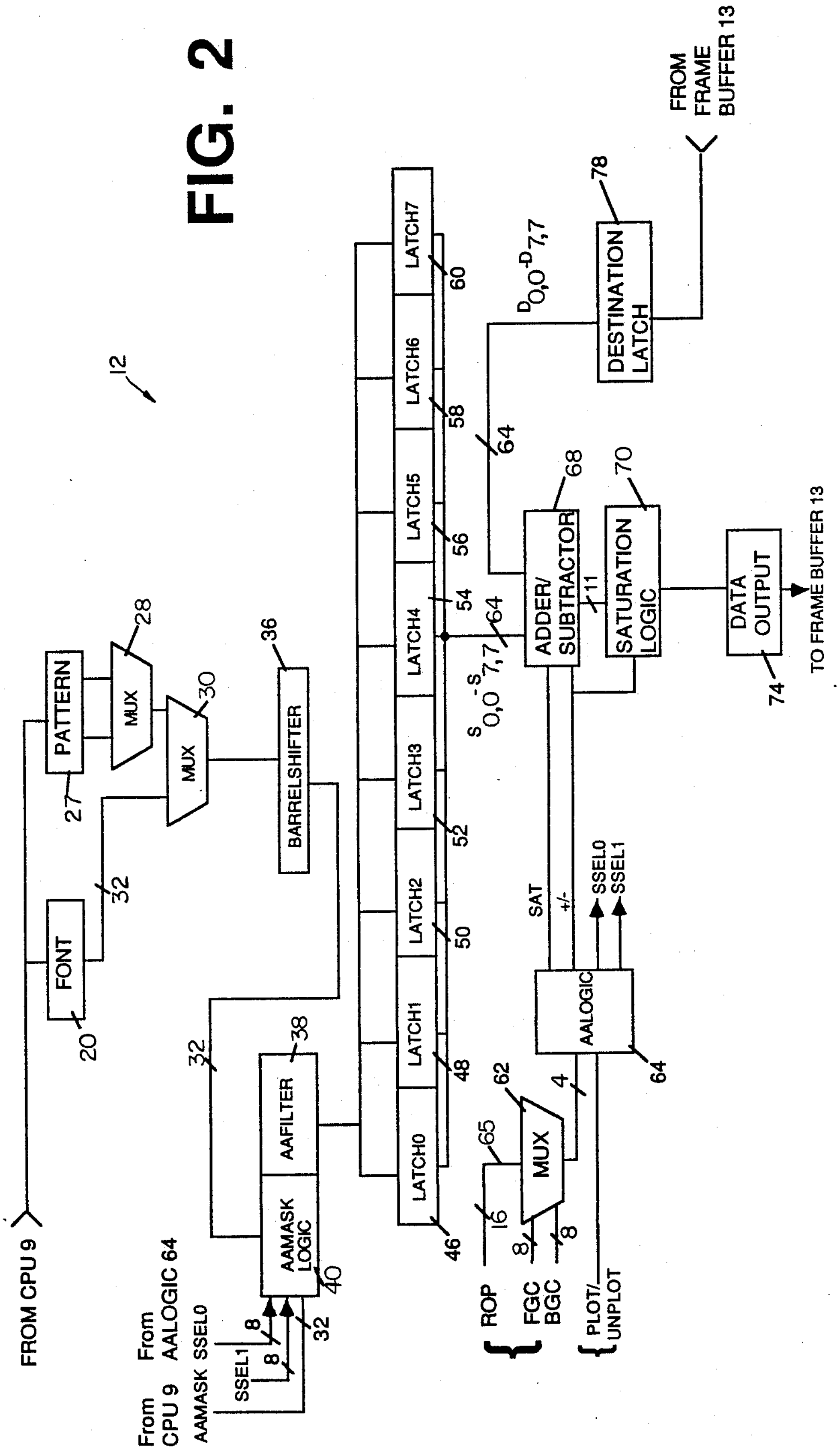
FIG. 2 is a block diagram of the data path circuitry which comprises the present invention.

Data path circuitry 12 will now be described in detail with reference to FIG. 2, which is a functional block level diagram of the data path circuitry 12 of FIG. 1. For purposes of the following explanation, the terms "destination" and "source" data will be introduced. Destination data is data which is written into the frame buffer or is the data currently residing at the address in the frame buffer about to be written. Source data is data which is provided from one of two sources, th CPU 9, which provides font source data to font register 20 and a pattern register 27 which stores a predetermined pattern and provides pattern source data. The data path circuitry 12 combines source data with the destination data and produces new destination data which is written to a desired location of the frame buffer, which in turn, is ultimately displayed on a video display.

Destination data, which is stored in destination latch 78, is read from the frame buffer at an addressed memory location of the frame buffer 13 via memory interface 14. The appropriate addresses are provided to memory interface 14 from the CPU 9. The destination data is held in latch 78 and then combined, by a Boolean operation specified by CPU 9, with one of the sources of data supplied by font register 20 or pattern register 27 as will be described below in more detail. The combination of a source and destination data yields a new destination data which is channeled through destination data output latch 74 and written to a location within the frame buffer memory specified by an address supplied by CPU 9 to memory interface 14.

In one mode of operation, the present invention combines font source data (supplied by font register 20) with frame buffer destination data (supplied by latch 78). When a display of font data is requested by a user, CPU 9 issues a command which causes font register 20 to output its font data. This data is then selected by multiplexer 30, as controlled by CPU 9, and inputted into barrel shifter 36.

Multiplexer 30 select the sources of data to be input to barrel shifter 36 as between font register 20 and pattern register 27. Barrel shifter 36 moves the font data from multiplexer 32 over a predetermined amount of bits so that it lines up over, for example, a 16 pixel memory access within frame buffer 13. For example, when a ten bit wide font is written which begins at the thirteenth pixel memory location of frame buffer 13, barrel shifter 36 is instructed, by CPU 9, to shift the font data over thirteen places, so that the beginning of the font data is aligned with the thirteenth address within the frame buffer 13 in the 16-pixel portion of frame buffer memory that will be operated on. It will therefore be appreciated that barrel shifter 36 is used for alignment s that when font data is written into the frame buffer memory, the font data will align in the correct memory location as determined by the address sent thereto by CPU 9.

The shifted over data supplied by barrel shifter 36 is operated on by anti-aliasing mask logic 40 and anti-aliasing filter 38 and channeled into a set of eight bit latches 46, 48, 50, 52, 54, 56, 58 and 60. This set of latches each store one pixel worth of data which will be written into the frame buffer (8 pixels total).

The present invention uses eight 8 bit latches so that each latch 46, 48, 50, 52, 54, 58 and 60 can store eight bits of data, and therefore contain eight planes of information (as described below with reference to FIG. 3 for each of eight pixels. The eight pixels of information will be half of a memory access since, in the preferred embodiment, a frame buffer memory space of 16 pixels (which corresponds to 16 pixels of a video display), may be updated in one memory access. The remaining eight pixels of information from the next memory access are sent to barrel shifter 36 and are distributed to latches 46, 48, 50, 52, 54, 56, 58 and 60 in the second half of the memory cycle operation in the same manner as the first. Latches 46, 48, 50, 52, 54, 56, 58 and 60 supply the font source data, eight bits at a time, to an input of adder/subtractor 68 which is described in further detail below. The frame buffer destination data held in destination latch 78 is channeled to a second input of adder/subtractor 68.

Multiplexer 62 which is also described in further detail below and adder/subtractor 68 then combine, by way of a selected Boolean operation, the frame buffer destination data from latch 78 with the font source data from latches 46, 48, 50, 52, 54, 56, 58, 60 which were originally supplied by font register 20. The possible Boolean operations which are common to graphics displays are shown in Table 1.

TABLE I

<table>
<tr><th>NUMBER</th><th>OPERATION</th><th>DESCRIPTION</th></tr>
<tr><td>0</td><td>CLEAR</td><td>d <- (0)</td></tr>
<tr><td>1</td><td>NOR</td><td>d <- (~((d) | (s)))</td></tr>
<tr><td>2</td><td>ERASE</td><td>d <- ((d) & ~(s))</td></tr>
<tr><td>3</td><td>DRAW INVERTED</td><td>d <- (~(s))</td></tr>
<tr><td>4</td><td>ERASE REVERSED</td><td>d <- ((~(d) & (s))</td></tr>
<tr><td>5</td><td>INVERT</td><td>d <- (~d))</td></tr>
<tr><td>6</td><td>XOR</td><td>d <- ((d) ^ (s))</td></tr>
<tr><td>7</td><td>NAND</td><td>d <- (~(d) & (s))</td></tr>
<tr><td>8</td><td>AND</td><td>d <- ((d) & (s))</td></tr>
<tr><td>9</td><td>EQUIVALENT</td><td>d <- (d) ^ (s))</td></tr>
<tr><td>10</td><td>NOP</td><td>d <- (d)</td></tr>
<tr><td>11</td><td>PAINT INVERTED</td><td>d <- (d) | ~(s))</td></tr>
<tr><td>12</td><td>DRAW</td><td>d <- (s)</td></tr>
<tr><td>13</td><td>PAINT REVERSED</td><td>d <- (~(d) | (s))</td></tr>
<tr><td>14</td><td>PAINT</td><td>d <- ((d) | (s))</td></tr>
<tr><td>15</td><td>SET</td><td>d <- (~0)</td></tr>
</table>

where

~ =one's complement

| =OR

^ =EXCLUSIVE OR

& =AND d=destination data s=source data

The source and destination data are combined by multiplexer 62 and adder/subtractor 68 in the following fashion. CPU 9 provides to multiplexer 62 four groups of four bits via data line 65. Each group of four bits encodes one of 16 possible Boolean operations. Multiplexer 62 is provided with, also by CPU 9, foreground color (FGC) and background color (BGC) status signals for each of eight planes. The FGC and BGC signals represent, respectively, the foreground and background colors of the image being rendered on the video display.

It will be appreciated that higher bit resolutions and more than two colors may be used.

Since for each plane there are four possible combinations of the FGC and BGC signals at the input of multiplexer 62, one of the four groups of four bits are selected as determined by the FGC and BGC signals. The selected four bit group which identifies the desired Boolean operation is outputted through anti-aliasing logic 64 to adder/subtractor 68 which then combines the source and destination data by way of the Boolean operation specified by multiplexer 62.

The result of the combination of the font source data and the frame buffer destination data $D_{0,0}$–$D_{7,7}$ is supplied to saturation logic 70 which operates on the data from adder/subtractor 68 as described below and then to latch 74 for outputting therefrom to memory interface 14 of FIG. 1. Memory interface 14 then writes the new destination data into frame buffer 13 at a memory location specified by an address supplied by the CPU 9.

Figure 3:
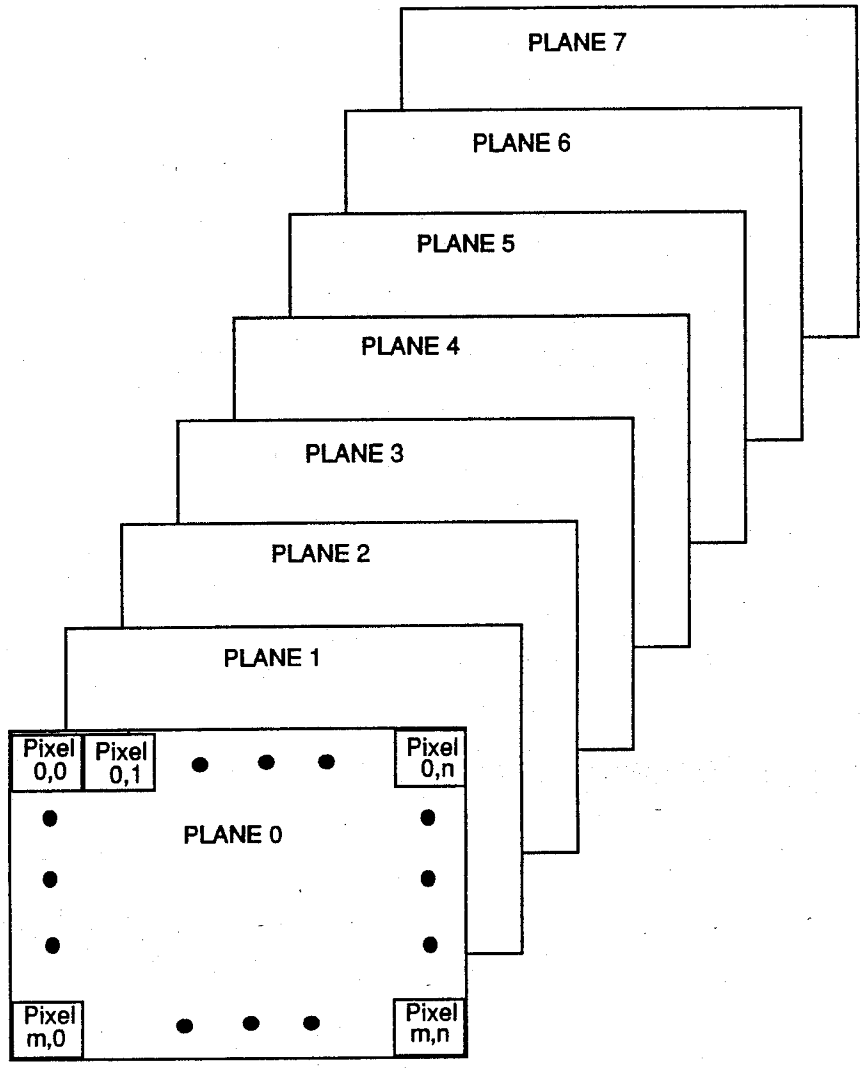
FIG. 3 is a diagramatic representation of the eight planes of information in a frame buffer.

The above combining of data is performed one plane at a time in the frame buffer memory since, in the preferred embodiment of the invention, the frame buffer memory is divided into eight planes, each plane representing the pixels on a video display as shown in FIG. 3.

Referring again to FIG. 2, for line drawing, pattern register 27 is used. Pattern register 27 is supplied with pattern source data by CPU 9. The pattern register is, in the preferred embodiment, a 16 by 16 bit matrix of binary values and is supplied with an address by the CPU 9 which selects a 16 bit row as a desired source. The 16 bit row will ultimately, when displayed, repeat logically across an entire scan line of a video display, beginning with every 16th pixel thereof. Multiplexer 28, as controlled by CPU 9, selects the 16 bit parcel of pattern data from pattern register 27, in eight bit increments. Multiplexer 30, which is also controlled by CPU 9, then selects an eight bit increment and channels it to barrel shifter 36.

Barrel shifter 36, when supplying pattern information, is passive and acts as a pipeline without shifting the data bits over a predetermined number of bits and supplies an eight bit increment of pattern data to anti-aliasing mask logic 40 which is described below which through anti-aliasing filter 38 passes the pattern data to latches 46, 48, 50, 52, 54, 56, 58 and 60.

The information contained in latches 46, 48, 50, 52, 54, 56, 58 and 60 are supplied, under CPU control, to adder/subtractor 68, which combines the source information supplied by pattern register 27 with destination data supplied by destination register 78 by way of a Boolean operation specified by CPU 9 as briefly described above and as described in detail below. The result of the combination of the pattern source data and the frame buffer destination data is supplied to latch 74 for outputting therefrom to memory interface 14 of FIG. 1. Memory interface 14 then writes the new destination data into frame buffer 13 at a memory location specified by an address supplied by the CPU 9.

The present invention is directed to a method and apparatus for performing anti-aliasing of rendered lines, text, and images. The following description will set forth how the present invention anti-aliases these objects with reference to the circuitry illustrated in FIG. 2.

Figure 4A:
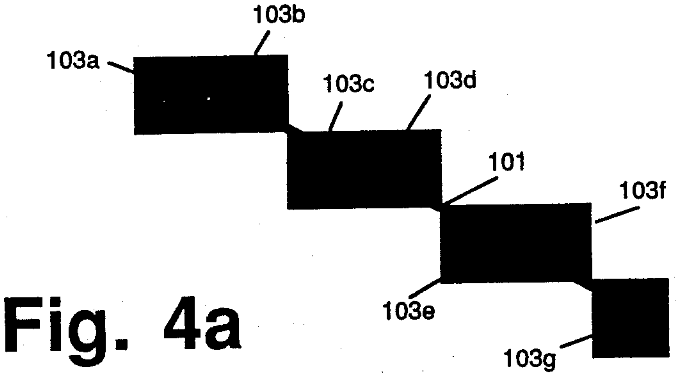
FIG. 4*a* is a diagramatic representation of a line showing uniformly darkened pixels causing aliasing.
Figure 4B:
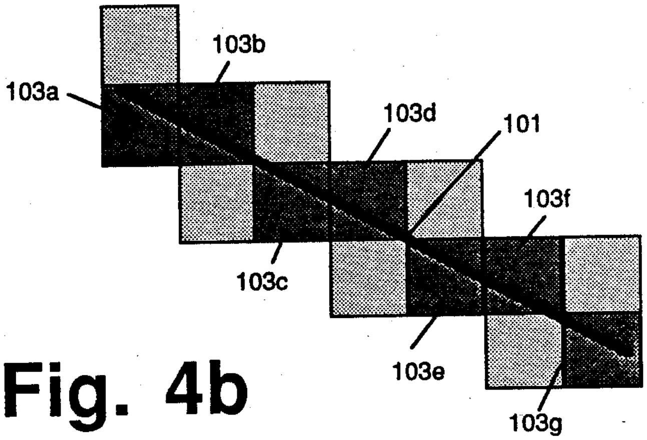
FIG. 4*b* is a diagramatic representation of a line showing pixels which have been shaded to lessen the effects of aliasing.

In FIG. 4(*a*), there is shown an illustration of a line segment 101 which is aliased. Each block 103*a*–103*g* represents a pixel on a video display. The pixels which are used to approximate the points on an ideal line produce jagged edges which are perceivable to the eye. FIG. 4(*b*) shows an anti-aliased line, wherein each point of the line is comprised of two pixels of varying shades. This gives the appearance to the eye of a much smoother line approaching the ideal. Accordingly, anti-aliasing is a method and apparatus for shading pixels so that the appearance of a diagonal line being rendered approaches that of an ideal line, by greatly reducing the perception of jagged edges as shown in FIG. 4(*b*). Anti-aliasing is a technique well known in the art of rendering images and is described, for example, in "The Aliasing Problem in Computer-Synthesized Shaded Images" by Franklin Crow, March 1976, UTEC-CSc-76-015, ARPA report. However, the present invention's implemention of anti-aliasing is a specific embodiment of the technique which typically requires separate complicated circuitry, as compared with the present invention which combines the circuitry for combining source and destination data with the circuitry for performing anti-aliasing, thereby providing a much simpler and less costly apparatus.

Figure 5:
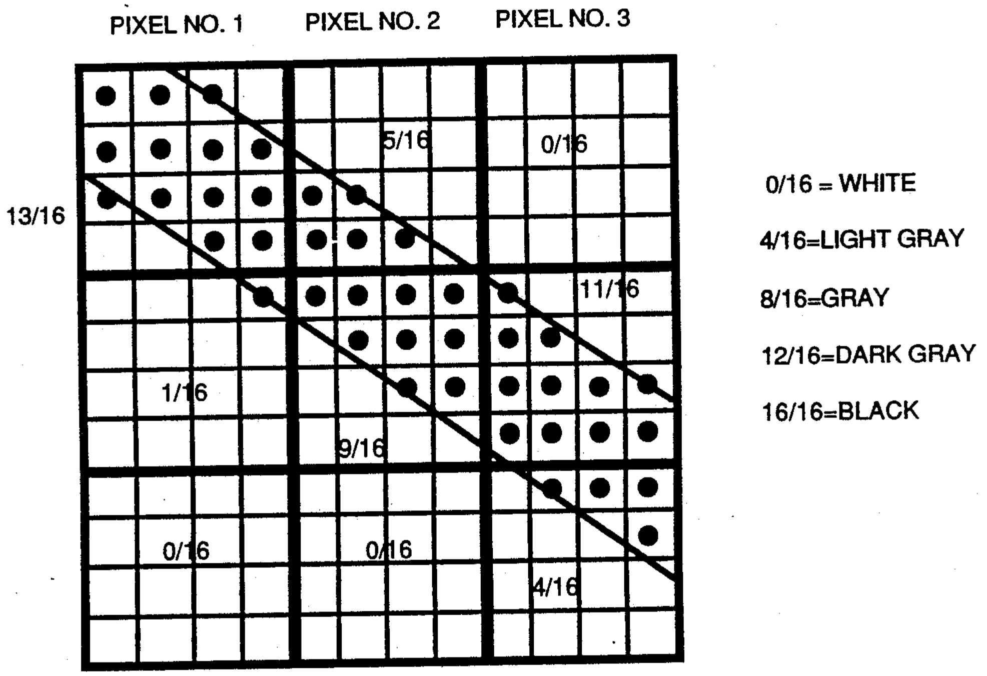
FIG. 5 is a diagramatic representation of pixels and sub-pixels.

In the present invention, each addressable frame buffer pixel in the frame buffer memory is logically divided into a group of 16 sub-pixels, so that, as shown in FIG. 5, the entire screen appears to CPU 9 as if it had 16 times more monochrome pixels than it actually has and is four times larger in the x direction and four times larger in the y direction than is actually present in the frame buffer. This is referred to as high resolution monochrome mode. The high resolution monoohrome data supplied by CPU 9 is eventually written to the lower resolution pixel coordinates stored in the frame buffer memory. When performing the mapping between the sub-pixel coordinates addressed by the CPU and the pixel coordinates stored in memory, the sub-pixel data (i.e. 16 separate bits of information for each pixel on the video screen) is converted to an appropriate gray scale value so that the anti-aliased line has appropriately shaded pixels at the edges of the line, as shown in FIG. 4(*b*).

Turning back now to FIG. 2 with reference to how the anti-aliasing operation of the present invention is performed, anti-aliasing multiplexer mask logic 40 and anti-aliasing filter 38 in addition to adder/substractor 68, saturation logic circuitry 70, multiplexer 62 and anti-aliasing logic 64 enables the circuitry previously described in FIG. 2 to utilize sub-pixel coordinates and perform anti-aliasing.

Referring again to FIG. 5, there is shown an example of the sub-pixel coordinate anti-aliasing feature of the present invention. FIG. 5 represents 9 pixels of a video display as represented in the frame buffer memory. As shown, each pixel is divided in the frame buffer memory into 16 sub-pixels. The calculated line which crosses 6 of the 9 pixels shown in FIG. 5 also crosses different sub-pixels among the 16 sub-pixels for each pixel. As shown in FIG. 5, each sub-pixel which the line being rendered crosses is represented by a dot and is assigned a value of 1 such that each pixel is assigned a numerical value representing the total number of sub-pixels which the line being rendered crosses.

For example, the upper-left-most pixel in FIG. 5 (designated as pixel number 1) has 13 sub-pixels which are crossed by the calculated line shown in FIG. 5. The 13 sub-pixels are each assigned a value of 1 such that the numerical value for pixel number 1 is 13/16. Pixel number 1 would therefore be shaded dark gray. Similarly, pixel number 2 which has only 5 sub-pixels crossed by the calculated line would be shaded light gray. The remaining pixels that the line of FIG. 5 crosses would be appropriately shaded depending upon the total number of sub-pixels of each pixel which the line falls upon. In this fashion, the smoothing of jagged edges is accomplished so that when viewing a video display, the eye will perceive the varying shades of gray as a more linear and less jagged line approaching the appearance of a video display having a resolution four times better than the actual resolution.

Figures 6A, 6B:
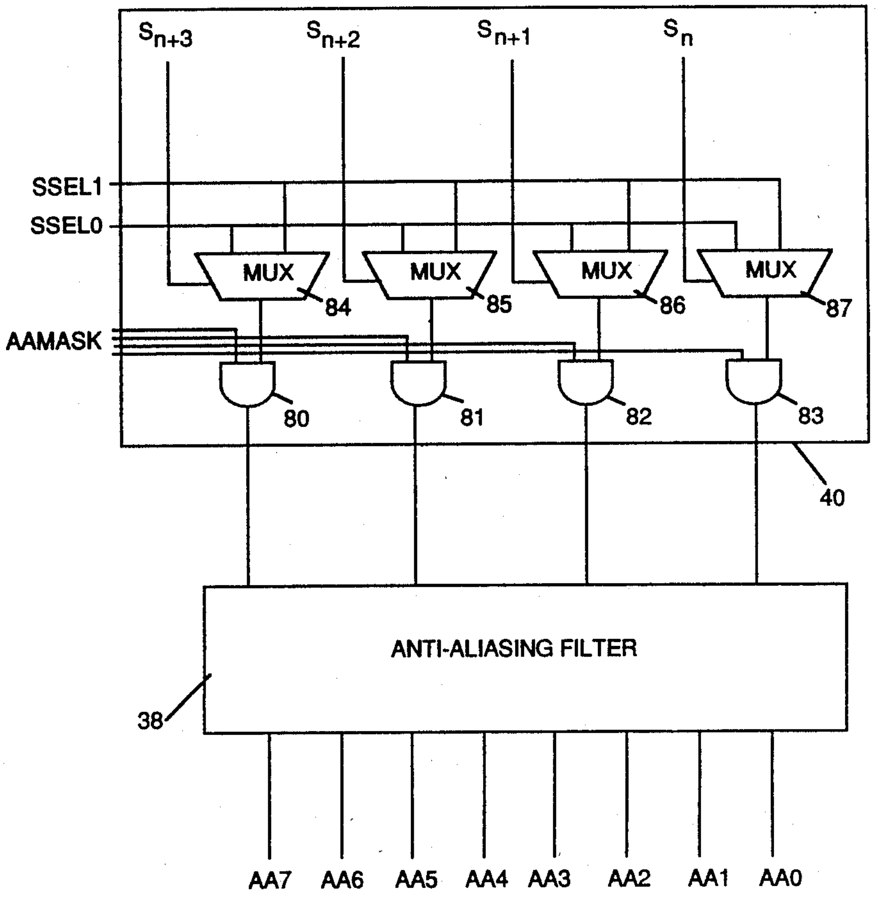
FIG. 6*a* is a schematic diagram of anti-aliasing mask 40 and anti-aliasing filter 38.
FIG. 6*b* is a truth table listing the possible inputs to each AND gate of anti-aliasing mask 40 for varying inputs on multiplexers 84–87.

Turning now to FIG. 6*a*, a schematic of the circuitry within anti-aliasing multiplexer mask logic 40 and filter 38 is shown. Mask 40 provides the sub-pixel numerical value to anti-aliasing filter 38. The lines $S_n$, $S_{n+1}$, $S_{n+2}$, $S_{n+3}$, of FIG. 6*a* represent the source data values of a horizontal row of four sub-pixels in the X direction of the 16 subpixels of each pixel, where N is 0–7 representing each of the eight pixels of information provided by barrel shifter 36. Accordingly, going back to the example of FIG. 5, the top row of pixel number 1 has three sub-pixels which have a one along the uppermost row and would be represented on lines $S_{n+3}$, $S_{n+2}$, $S_{n+1}$, $S_n$ of FIG. 6*a* as having a one on $S_{n+3}$, a one on $S_{n+2}$, a one on $S_{n+1}$ and a zero on $S_n$ since only three sub-pixels of the first row are crossed by the line going through pixel number 1 of FIG. 5. The row immediately below the uppermost row of pixel number 1, which has four sub-pixels touched by the line going across pixel number 1, would be represented by a one on each of the lines $S_{n+3}$, $S_{n+2}$, $S_{n+1}$, $S_n$ since all four sub-pixels are crossed by the line going across pixel number 1.

Mask logic 40 comprises MUXes 84–87 and AND gates 80–83. This logic is repeated eight times, or once for each of the eight pixels available at one time from barrel shifter 36. The operation of the logic circuitry for each of the eight pixels is identical to that of mask logic 40.

The control lines of multiplexers 84, 85, 86 and 87 are data lines $S_{n+3}$, $S_{n+2}$, $S_{n+1}$, $S_n$ while what are typically control lines are used as data lines, namely select one (SSEL1) and select zero (SSEL0). SSEL0 and SSEL1 are generated by anti-aliasing logic 64 as described below. AND gates 80, 81, 82 and 83 serve as masks for masking sub-pixel values outputted by multiplexers 84, 85, 86 and 87 so that a zero, when needed, will be presented to anti-aliasing filter 38. This prevents unneeded (or unincluded) sub-pixels from contributing to the filter output value. For example, if it desired to mask the output of multiplexer 84, the signal AAMASK from CPU 9 for the subpixel corresponding thereto is set to 0 to present a zero at one input to AND gate 80 such that a 0 at the output of AND gate 80 is presented to anti-aliasing filter 38, regardless of the output value of MUX 84. The truth table of FIG. 6*b* lists the possible inputs to each AND gate for varying inputs on multiplexers 84–87. The source can be overriden to zero by setting SSEL0 and SSEL1 to zero. The source can be complemented by setting SSEL0 to zero and SSEL1 to one. The source can be passed unchanged by setting SSEL0 to one and SSEL1 to zero. The source can be overridden to one by setting both SSEL0 and SSEL1 to one.

In this manner, four sub-pixels per memory cycle operation are transmitted through to anti-aliasing filter 38. Anti-aliasing filter 38 operates as an encoder and provides a single output which represents a particular combination of the four outputs of the mask 40. Specifically, filter 38 sums the outputs of AND gates 80–83 and places the sum on $AA_3AA_5$. $AA_0$–$AA_2$ and $AA_6$–$AA_7$ are always 0.

The outputs of the AND gates 80, 81, 82 and 83 present to anti-aliasing filter 38 four binary bits which are transformed by the anti-aliasing filter 38 into a binary number having a value of 0, 1, 2, 3 or 4 and multiplies the number by 8 to obtain an eight bit value of 0, 8, 16, 24 or 32, which corresponds to five different shades of gray. This eight bit value is then inputted to the corresponding latch among latches 46, 48, 50, 52, 54, 56, 58 and 60 of FIG. 2. There are eight anti-aliasing filters and corresponding masks, one for each latch 46, 48, 50, 52, 54, 56, 58 and 60 as shown in FIG. 2. Each of the latches 46, 48, 50, 52, 54, 56, 58 and 60 represent a row of four horizontal sub-pixels of a single pixel at a time. For example, latch 46 will store the four bit value representing a numerical value of a particular row of four sub-pixels of a particular pixel. Latch 46, in turn, outputs this value to adder/subtractor 68 which, in turn adds the numerical value of all 4 rows of sub-pixels for each pixel and presents this number to saturation logic circuitry 70. Saturation logic circuitry 70 optionally saturates the total value at 128 and 0 so that only values in between 128 and 0 are presented to output latch 74. The details of adder/subtractor 68 and saturation logic circuitry 70 are explained below with reference to FIG. 7. Values are multiplied by 8 to obtain the range 0 to 128 because, in the preferred embodiment, there are only 16 different shades of monochrome color from white to black stored in look-up table 15 of FIG. 1.

Figure 7:
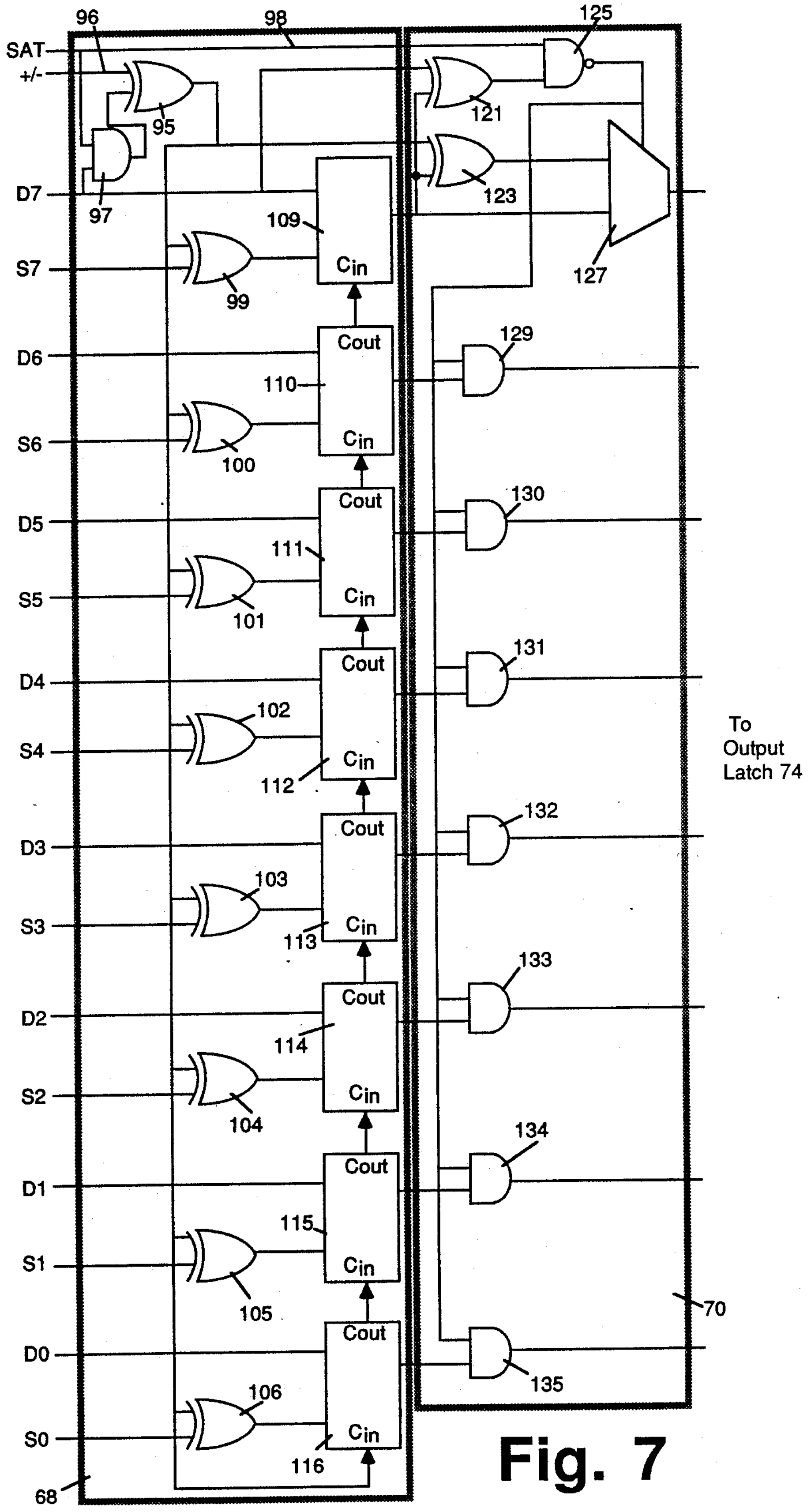
FIG. 7 is a schematic diagram of adder/subtractor logic 68 and saturation logic 70.

Referring now to FIG. 7, adder/subtractor 68 comprises XOR gates 95 and 99–106, AND gate 97 and one bit full adders 109–116. Inputs S0–S7, which are one input to XOR gates 99–106, correspond to eight of the 64 bits output from latches 46, 48, 50, 52, 54, 56, 58 and 60. Similarly, D0–D7 are values from destination latch 78. Although only one pixel of eight destination and source bits are shown, the additional circuitry needed to handle eight pixels or 64 bits of source and destination data would be well within the abilities of a person having ordinary skill in the art. When a subtraction is to be performed, a 1 is place on line 96 and a subtraction operation is performed between S0–S7 and D0–D7 by operation of one bit full adders 109–116. Similarly, placing a 0 on line 96 causes an addition to take place. The result of the addition or subtraction performed by adder/subtractor 68 is input to saturation logic 70 which comprises XOR gates 121 and 123, NAND gate 125, multiplexer 127 and AND gates 129–135. When a zero is placed on line 98, multiplexer 127 selects the output from one bit adder 109 and AND gates 129–135 produce the outputs from adders 110–116 respectively. On the other hand, when line 98 is set to 1, NAND gate 125 outputs a 0 or 1 as a function of D7 and the output of full bit adder 109 such that when the output of NAND gate 125 is 0, multiplexer 127 selects the output from XOR gate 123 and the outputs of AND gates 129–135 are 0. In this manner, saturation logic 70 saturates the total value at 128 and 0 so that only values between 128 and 0 are presented to multiplexer 72.

Figure 8:
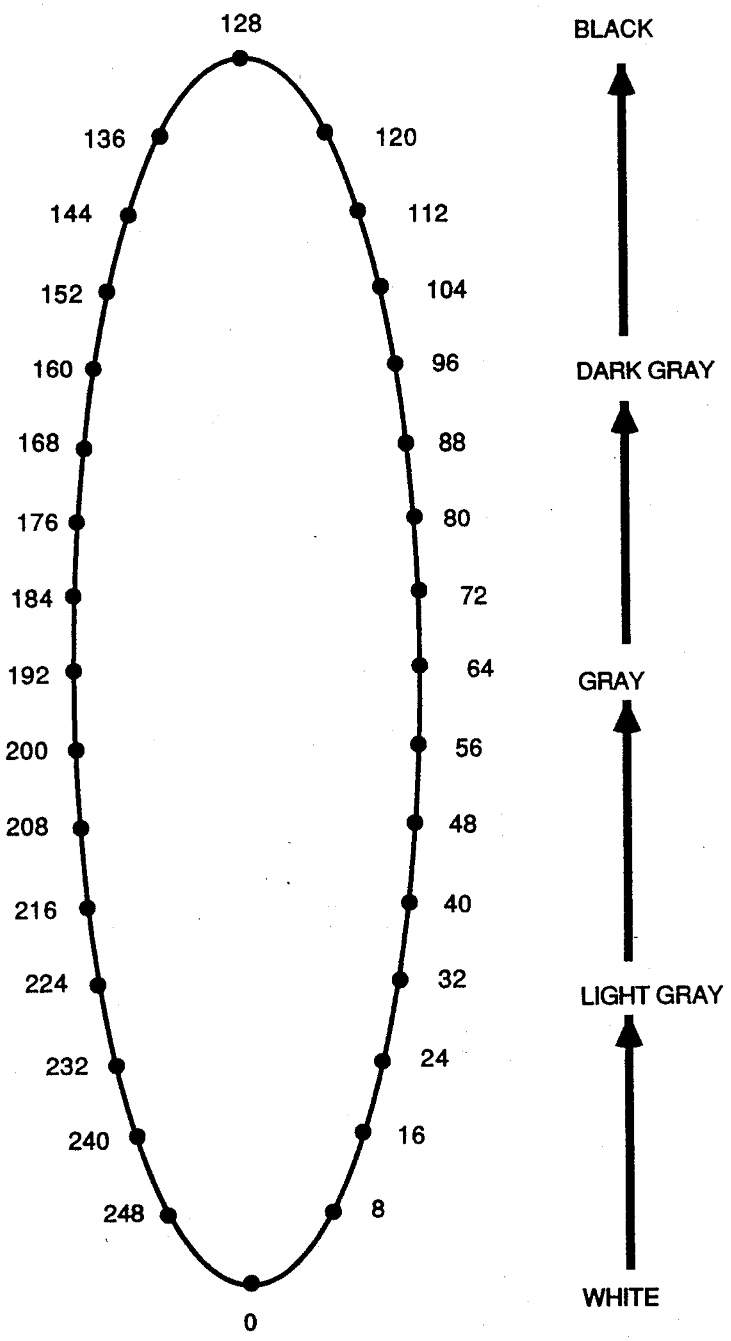
FIG. 8 is a monochrome scale representing gray shades in look-up table 15.

When the value supplied to adder/subtractor 68 from latches 46, 48, 50, 52, 54, 56, 58 or 60 is to be subtracted from the value previously derived, supplied by latch 78, in order to effect an undraw operation (i.e. to retrace exactly the line which is previously drawn in order to erase the line from the display), adder/subtractor 68 subtracts the new value from the previous value (as read from memory interface 14) while saturation logic 70 is deactivated such that the value subtracted is supplied to output latch 74 for output therefrom to memory interface 14. During scanning of the frame buffer, the valves are fed into lock-up table 15 of FIG. 1 which correlates different values from 0 to 128 with varying shades of monochrome color from white to black. Look up table 15 also correlates numerical values 8 to 120 with the same varying shades of monochrome color assigned to values 248 to 136. This is conceptionally illustrated in FIG. 8 wherein there is shown a correspondence of the values 0 to 255 to different shades ranging from black to white. For example, if the result of the addition of all the sub-pixel values of a particular pixel are set which would represent black, in order to erase a line, the pixel shaded black would have to be shaded white. Since the previous operation described was an addition, a numerical value of 128 would have to be subtracted, by adder/subtractor 68, from the previous numerical value of 128 in order to get a value of 0 which corresponds to the complement of black which is white. The user would therefore command, by way of CPU 9, a subtraction of 128 from the previous pixel value in the manner previously described to arrive at the color white. Look-up table 15 is correlated so that there are two values assigned to the same shade such that, for example, both 96 and 160 represent dark gray while both 64 and 192 represent gray, etc., as shown in FIG. 8. The only exception is that 0 represents pure white while 128 represents pure black. The addition or subtraction moves through the look-up table in a single direction for a desired draw and undraw operation, i.e. only clockwise for undraw and counter-clockwise for draw around the grayscale shown in FIG. 8. It will be appreciated that higher or lower bit resolutions involving a greater or lesser number of shades may be used without departing from concepts of the present invention as well as greater or lesser pixel granularity in terms of more or less sub pixels per pixel.

The signals SAT placed on line 98, +/− placed on line 96, SSEL0 and SSEL1 are generated by anti-aliasing logic 64 according to the following truth table, where PLOT/UNPLOT=0 means plot and PLOT/UNPLOT=1 means unplot:

| RASTER OPERATION | MUX 62 OUTPUT | PLOT/ UNPLOT | SAT | +/− | SSEL0 | SSEL1 |
|---|---|---|---|---|---|---|
| CLEAR | 0 | 0 | 1 | 0 | 1 | 1 |
| | 0 | 1 | 1 | 0 | 1 | 1 |
| ERASE | 2 | 0 | 1 | 0 | 1 | 0 |
| | 2 | 1 | 1 | 0 | 1 | 0 |
| INVERT | 5 | 0 | 0 | 1 | 1 | 1 |
| | 5 | 1 | 0 | 0 | 1 | 1 |
| XOR | 6 | 0 | 0 | 1 | 1 | 0 |
| | 6 | 1 | 0 | 0 | 1 | 0 |
| AND | 8 | 0 | 1 | 0 | 0 | 1 |
| | 8 | 1 | 1 | 0 | 0 | 1 |

-continued

| RASTER OPERATION | MUX 62 OUTPUT | PLOT/ UNPLOT | SAT | +/− | SSEL0 | SSEL1 |
|---|---|---|---|---|---|---|
| EQUIVALENT | 9 | 0 | 0 | 1 | 0 | 1 |
| | 9 | 1 | 0 | 0 | 0 | 1 |
| NOP | A | 0 | 0 | 1 | 1 | 0 |
| | A | 1 | 0 | 1 | 1 | 0 |
| PAINT INVERTED | B | 0 | 1 | 1 | 0 | 1 |
| | B | 1 | 1 | 1 | 0 | 1 |
| PAINT | E | 0 | 1 | 1 | 1 | 0 |
| | E | 1 | 1 | 1 | 1 | 0 |
| SET | F | 0 | 1 | 1 | 1 | 1 |
| | F | 1 | 1 | 1 | 1 | 1 |

For the raster operations not shown in the foregoing table, i.e., NOR, DRAW INVERTED, ERSSE REVERSED, NAND, DRAW and PAINT REVERSED, anti-aliasing operations are not applicable.

Table II shows for each Boolean raster operation described in Table I, the equivalent anti-aliasing raster operation as defined in the prededing truth table, where d is destination; s is source; SAT is a logic 1 on line 98; PLOT is logic 1 on line PLOT/UNPLOT; UNPLOT is a logic 0 on line PLOT/UNPLOT; — is a logic 0 on line 96; + is a logic 1 on line 96; and na means there is no anti-aliasing raster operation available for that Boolean raster operation:

TABLE II

<table>
<tr><th>OPERATION</th><th>DESCRIPTION</th><th>PLOT</th><th>UNPLOT</th></tr>
<tr><td>CLEAR</td><td>d <– (0)</td><td>d = sat(d – 1)</td><td>d = sat(D – 1)</td></tr>
<tr><td>NOR</td><td>d <– (~((d) | (s)))</td><td>na</td><td>na</td></tr>
<tr><td>ERASE</td><td>d <– ((d) & ~(s))</td><td>d = sat(d – s)</td><td>d = sat(d – s)</td></tr>
<tr><td>DRAW INVERTED</td><td>d <– (~(s))</td><td>na</td><td>na</td></tr>
<tr><td>ERASE REVERSED</td><td>d <– ((~(d) & (s))</td><td>na</td><td>na</td></tr>
<tr><td>INVERT</td><td>d <– (~d))</td><td>d = d + 1</td><td>d = d – 1</td></tr>
<tr><td>XOR</td><td>d <– ((d) ^ (s))</td><td>d = d + s</td><td>d = d – s</td></tr>
<tr><td>NAND</td><td>d <– (~(d) & (s))</td><td>na</td><td>na</td></tr>
<tr><td>AND</td><td>d <– ((d) & (s))</td><td>d = sat(d – ~s)</td><td>d = sat(d – ~s)</td></tr>
<tr><td>EQUIVALENT</td><td>d <– (d) ^ ~(s))</td><td>d = d + ~s</td><td>d = d – ~s</td></tr>
<tr><td>NOP</td><td>d <– (d)</td><td>d = d</td><td>d = d</td></tr>
<tr><td>PAINT INVERTED</td><td>d <– (d) | ~(s))</td><td>d = sat(d+~s)</td><td>d = sat(d +~s)</td></tr>
<tr><td>DRAW</td><td>d <– (s)</td><td>na</td><td>na</td></tr>
<tr><td>PAINT REVERSED</td><td>d <– (~(d) | (s))</td><td>na</td><td>na</td></tr>
<tr><td>PAINT</td><td>d <– ((d) | (s))</td><td>d = sat(d + s)</td><td>d = sat(d + s)</td></tr>
<tr><td>SET</td><td>d <– (~0)</td><td>d = sat(d + 1)</td><td>d = sat(d + 1)</td></tr>
</table>

It will also be appreciated that the above-described invention may be embodied in other specific forms without departing from the spirit or scope thereof. The foregoing description, therefore should be viewed as illustrative and not restrictive, the scope of the invention being set forth in the following claims.

We claim:

1. An apparatus including a central processing unit for generating control signals including background color control signals and foreground color control signals, said apparatus for performing Boolean raster operations on source and destination data for storage in a frame buffer memory for a plurality of planes, said source data being selected from one of a font register and a pattern register, said destination data being selected from said frame buffer, wherein said destination data stored in said frame buffer is organized as pixels of information to be displayed, and each of said pixels is logically divided into a plurality of sub-pixels, said apparatus comprising:

(a) source data select means coupled to said font register and said pattern register for selecting source data;

(b) anti-aliasing mask logic coupled to said source data select means and said central processing unit for generating for each of said pixels to be displayed a fraction between 0 and 1 representing the ratio of the number of sub-pixels crossed by an image segment going through the pixel to the total number of sub-pixels within the pixel to the total number of sub-pixels with the pixel corresponding to said sub-pixels;

(c) filter means coupled to said mask logic means for encoding the output generated by said mask logic means, said encoded output corresponding to one of a plurality of shades of gray for each of said pixels to be displayed;

(d) multiplexer means coupled to said central processing unit and said anti-aliasing mask logic means for selecting a Boolean raster operation to be performed for each of said plurality of planes using said foreground color control signals and said background color control signals;

(e) logic means coupled to said multiplexer means and said central processing unit for generating SSEL0 and SSEL1 control signals used by said anti-aliasing mask logic means, a saturation control signal and a +/− control signal;

(f) adder/subracter means coupled to said source data select menas, said frame buffer and said logic means for adding and subtracting the sub-pixel values for each row of sub-pixel information in each pixel;

(g) saturation logic means coupled to said adder/subtracter means for saturating the values output by said adder/subtracter means to values between 0 and 128.

2. The apparatus defined by claim 1 wherein said source data select means comprises a multiplexer for selecting source data form one of said font register and said pattern register under control of said central processing unit.

3. The apparatus defined by claim 1 wherein said anti-aliasing mask logic means comprises:

(a) a plurality of groups of multiplexers, the number of groups of multiplexers corresponding to the number of pixels of information available from said source data select means and whose control inputs are for each of said multiplexers, the source data values of a horizontal row of sub-pixels, a first data input of each of said multiplexers being the signal SSEL0 and a second data input of each of said multiplexers being the signal SSEL1;

(b) a plurality of AND gates, the output of each of said multiplexers being a first input to a corresponding one said plurality of AND gates, a second input of said plurality of AND gates being a signal AAMASK for masking sub-pixel values outputted by a corresponding one of said plurality of multiplexers.

4. The apparatus defined by claim 3 wherein said filter means comprises logic circuitry which sums the outputs of said AND gates and multiplies the number by eight to obtain an eight bit value of 0, 8, 16, 24 or 32.

5. The apparatus defined by claim 1 wherein said multiplexer means comprises a multiplexer whose control inputs are said foreground and background color control signals and whose data input is a number corresponding to said Boolean raster operation to be performed.

6. The apparatus defined by claim 1 wherein said logic means comprises a logic circuit for implementing the following truth tables for the Boolean raster operations CLEAR, ERASE, INVERT, XOR, AND, EQUIVALENT, NOP, PAINT INVERTED, PAINT, and SET having hexidecimal codes of 0, 2, 5, 6, 8, 9, A, B, E and F respectively, and wherein the signals SAT, +/−, SSEL0 and SSEL1 are generated as a function of the Boolean raster operation and a signal PLOT/UNPLOT, where PLOT/UNPLOT=0 means plot and PLOT/UNPLOT=1 means unplot:

| RASTER OPERATION | PLOT/ UNPLOT | SAT | +/− | SSEL0 | SSEL1 |
|---|---|---|---|---|---|
| 0 | 0 | 1 | 0 | 1 | 1 |
| 0 | 1 | 1 | 0 | 1 | 1 |
| 2 | 0 | 1 | 0 | 1 | 0 |
| 2 | 1 | 1 | 0 | 1 | 0 |
| 5 | 0 | 0 | 1 | 1 | 1 |
| 5 | 1 | 0 | 0 | 1 | 1 |
| 6 | 0 | 0 | 1 | 1 | 0 |
| 6 | 1 | 0 | 0 | 1 | 0 |
| 8 | 0 | 1 | 0 | 0 | 1 |
| 8 | 1 | 1 | 0 | 0 | 1 |
| 9 | 0 | 0 | 1 | 0 | 1 |
| 9 | 1 | 0 | 0 | 0 | 1 |
| A | 0 | 0 | 1 | 1 | 0 |
| A | 1 | 0 | 1 | 1 | 0 |
| B | 0 | 1 | 1 | 0 | 1 |
| B | 1 | 1 | 1 | 0 | 1 |
| E | 0 | 1 | 1 | 1 | 0 |
| E | 1 | 1 | 1 | 1 | 0 |
| F | 0 | 1 | 1 | 1 | 1 |
| F | 1 | 1 | 1 | 1 | 1 |

7. The apparatus defined by claim 1 wherein said adder/substracter means comprises:

(a) a plurality of exclusive OR gates having one input coupled to a corresponding source data line;

(b) a plurality of full bit adders corresponding to said plurality of exclusive OR gates, the output of each of said plurality of exclusive OR gates coupled to a first input of a corresponding full bit adder, a second input of each of said full bit adders being a corresponding destination data line, there being one destination data line for each bit of said destination data wherein the highest order destination data bit has a high order destination data line;

(c) an AND gate having a first input coupled to said high order destination data line, a second input of said AND gate being said saturation signal;

(d) an exclusive OR gate having a first input coupled to the output of said AND gate, a second input of said exclusive OR gate being said +/− control signal, the output of said exclusive OR gate coupled to a second input of each of said plurality of exclusive OR gates and a carry input of on of said full bit adders.

8. The apparatus defined by claim 7 wherein said saturation logic means comprises:

(a) first and second exclusive OR gates, said first exclusive OR gate having a first input coupled to said first input of said AND gate and a second input coupled to the output of the full bit adder whose second input is said high order destination data line, said second exclusive OR gate having a first input coupled to said second input of said first exclusive OR gate and a second input coupled to sad high order destination data line;

(b) a NAND gate having a first input coupled to said saturation control signal and a second input coupled to the output of said first exclusive OR gate;

(c) a plurality of AND gates having a first input coupled to the output of a corresponding one of said full bit adders excepting for said full bit adder coupled to said high order destination data line, a second input of each of said plurality of AND gates being the output of said NAND gate;

(d) a multiplexer having a first data input coupled to the output of said second exclusive OR gate and a second data input coupled to the output of said full bit adder coupled to said high order destination data line, the control input of said multiplexer being the output of said NAND gate.

9. A method for performing Boolean raster operations on source and destination data for storage in a frame buffer memory for a plurality of planes in a workstation including a central processing unit for generating control signals including background color control signals and foreground color control signals, said source data being selected from one of a font register and a pattern register, said destination data being selected from said frame buffer, wherein said destination data stored in said frame buffer is organized as poxels of information to be displayed, and each of said pixels is logically divided into a plurality of sub-pixels, said method comprising the steps of:

(a) selecting source data from one of said font register and said pattern register;

(b) generating a number corresponding to a gray scale value for each of said pixels to be displayed as a function of the ratio of the number of sub-pixels crossed by an image segment going through the pixel corresponding to said sub-pixels to the total number of sub-pixels within said pixel;

(c) encoding the output generated by said generating step, said encoded putput corresponding to one of a plurality of shades of gray for each of said pixels to be displayed;

(d) selecting a Boolean raster operation to be performed for each of said plurality of planes using said foreground color control signals and said background color control signals;

(e) generating SSEL0 and SSEL1 control signals used by said gray scale value generating step, a saturation control signal and a +/− control signal;

(f) adding and subtracting the sub-pixel values generated by said gray scale value generating step for each row of sub-pixel information in each pixel;

(g) saturating the values output generatied by said adder/subtracter step to values between 0 and 128.

10. The method defined by claim 9 wherein said selecting step comprises the step of selecting source data from one of said font register and said pattern register under control of said central processing unit.

11. The method defined by claim 9 wherein said gray scale value generating step comprises the steps of:

(a) inputting to a plurality of groups of multiplexers, the number of groups of multiplexers corresponding to the number of pixels of information available from said source data select select step as control inputs for each of said multiplexers, the source data values of a horizontal row of sub-pixels, a first data input of each of said multiplexers being the signal SSEL0 and a second data input of each of said multiplexers being the signal SSEL1;

(b) inputting as a first input to a plurality of AND gates, the output of a corresponding one of said multiplexers, a second input of said plurality of AND gates being a signal AAMASK for masking sub-pixel values outputted by a corresponding one of said plurality of multiplexers.

12. The method defined by claim 11 wherein said encoding step sums the outputs of said AND gates and multiplies the number by eight to obtain an eight bit value of 0, 8, 16, 24 or 32.

13. The method defined by claim 9 wherein said Boolean raster operation selection step comprises the steps of inputting to a multiplexer as its control inputs, said foreground and background color control signals, and inputting as the data input of said multiplexer a number corresponding to said Boolean raster operation to be performed.

14. The method defined by claim 9 wherein said adding and subtracting step comprises the steps of:

(a) inputting as one input of a plurality of exclusive OR gates a corresponding source data line;

(b) inputting as a first input to a plurality of full bit adders corresponding to said plurality of exclusive OR gates, the output of each of said plurality of exclusive OR gates, a second input of each of said full bit adders being a corresponding destination data line, there being one destination data line for each bit of said destination data wherein the highest order destination data bit has a high order destination data line;

(c) inputting as a first input to an AND gate said high order destination data line, a second input of said AND gate being said saturation signal;

(d) inputting to an exclusive OR gate the output of said AND gate, a second input of said exclusive OR gate being said +/− control signal, the output of said exclusive OR gate coupled to a second input of each of said plurality of exclusive OR gates and a carry input of one of said full bit adders.

15. The method defined by claim 14 wherein said saturating step comprises the steps of:

(a) inputting as a first input to a first exclusive OR gate, said first input of said AND gate and a second input coupled to the output of the full bit adder whose second input is said high order destination data line, and inputting as a first input of a second exclusive OR gate said second input of said first exclusive OR gate and inputting as a second input of said second exclusive OR gate said high order destination data line;

(b) inputting as a first input to a NAND gate said saturation control signal and as a second input to said NAND gate the output of said first exclusive OR gate;

(c) inputting as a first input to each of a plurality of AND gates the output of a corresponding one of said full bit adders excepting for said full bit adder coupled to said high order destination data line, a second input of each of said plurality of AND gates being the output of said NAND gate;

(d) inputting as a first data input to a multiplexer the output of said second exclusive OR gate and inputting as a second data input to said multiplexer the output of said full bit adder coupled to said high order destination data line, the control input of said multiplexer being the output of said NAND gate.

* * * * *

UNITED STATES PATENT AND TRADEMARK OFFICE
CERTIFICATE OF CORRECTION

PATENT NO. : 4,908,780

DATED : 3/13/90

INVENTOR(S) : Priem et al.

It is certified that error in the above-identified patent and that said Letters Patent is hereby corrected as shown below:

| | | |
|---|---|---|
| col. 01, line 48 | delete "th" | insert --the-- |
| col. 02, line 20 | delete "th" | insert --the-- |
| col. 02, line 63 | delete "s" | insert --so-- |
| col. 03, line 45 | delete "9 EQUIVALENT d< - (d) ∧ (s))" | |
| | insert --9 EQUIVALENT d< - (d) ∧ ~ (s))-- | |
| col. 05, line 30 | delete "monoohrome" | insert --monochrome-- |
| col. 07, line 01 | delete "$AA_3AA_5$" | insert --$AA_3$ - $AA_5$-- |
| col. 08, line 16 | delete "lock-up" | insert --look-up-- |
| col. 09, line 15 | delete "ERSSE' | insert --ERASE-- |
| col. 09, line 20 | delete "prededing" | insert --preceding-- |
| col. 09, line 67 | after "logic" | insert --means-- |

UNITED STATES PATENT AND TRADEMARK OFFICE
CERTIFICATE OF CORRECTION

PATENT NO. : 4,908,780

DATED : 3/13/90

INVENTOR(S) : Priem et al.

It is certified that error in the above-identified patent and that said Letters Patent is hereby corrected as shown below:

| | | |
|---|---|---|
| col. 10, lines 18-19 | after "pixel" | delete "to the total number of sub-pixels with the pixel" |
| col. 10, line 56 | delete "subracter" | insert --subtracter-- |
| col. 10, line 57 | delete "menas" | insert --means-- |
| col. 10, line 66 | delete "form" | insert --from-- |
| col. 11, line 62 | delete "substracter" | insert --subtracter-- |
| col. 12, line 14 | delete "on" | insert --one-- |
| col. 12, line 26 | delete "sad" | insert --said-- |
| col. 12, line 51 | delete "poxels" | insert --pixels-- |
| col. 12, line 64 | delete "putput" | insert --output-- |
| col. 13, line 11 | delete "generatied" | insert --generated-- |

Signed and Sealed this

Tenth Day of March, 1992

*Attest:*

HARRY F. MANBECK, JR.

*Attesting Officer*

*Commissioner of Patents and Trademarks*